US007782802B2

(12) United States Patent
Moore et al.

(10) Patent No.: US 7,782,802 B2
(45) Date of Patent: Aug. 24, 2010

(54) OPTIMIZING CONFERENCING PERFORMANCE

(75) Inventors: Tim M. Moore, Bellevue, WA (US); Warren V. Barkley, Mill Creek, WA (US); Yiu-Ming Leung, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 11/964,376

(22) Filed: Dec. 26, 2007

(65) Prior Publication Data

US 2009/0172095 A1     Jul. 2, 2009

(51) Int. Cl.
*H04L 12/16* (2006.01)
*H04M 1/00* (2006.01)
*G06F 15/16* (2006.01)

(52) U.S. Cl. ................ 370/261; 370/352; 379/158; 379/202.01; 709/204

(58) Field of Classification Search ............ None
See application file for complete search history.

(56) References Cited

U.S. PATENT DOCUMENTS

| | | | |
|---|---|---|---|
| 5,127,001 A | 6/1992 | Steagall et al. | 370/62 |
| 6,327,276 B1* | 12/2001 | Robert et al. | 370/535 |
| 6,463,414 B1* | 10/2002 | Su et al. | 704/270.1 |
| 6,678,654 B2* | 1/2004 | Zinser et al. | 704/221 |
| 6,728,358 B2 | 4/2004 | Kwan | 379/202.01 |
| 7,058,026 B1* | 6/2006 | Hera et al. | 370/265 |
| 7,225,459 B2 | 5/2007 | Magliaro | 725/98 |
| 7,420,935 B2* | 9/2008 | Virolainen | 370/263 |
| 7,428,223 B2* | 9/2008 | Nierhaus et al. | 370/260 |
| 7,505,423 B2* | 3/2009 | Flowers et al. | 370/260 |
| 2003/0103243 A1 | 6/2003 | Watanabe et al. | 358/405 |
| 2005/0185602 A1 | 8/2005 | Simard et al. | 370/260 |
| 2006/0018307 A1* | 1/2006 | Michalewicz et al. | 370/352 |
| 2006/0067251 A1 | 3/2006 | Hagendorft | 370/261 |

(Continued)

OTHER PUBLICATIONS

Ramachandran Ramjee et al., "Adaptive Playout Mechanisms for Packetized Audio Applications in Wide-Area Networks," 9 pgs., http://www1.cs.columbia.edu/~hgs/papers/Ramj94_Adaptive.pdf.

(Continued)

*Primary Examiner*—Steven H Nguyen
(74) *Attorney, Agent, or Firm*—Merchant & Gould

(57) ABSTRACT

Optimized conferencing performance may be provided. First, a plurality of data streams respectively received from a plurality of conferencing users may be monitored. Then, for each of the plurality of conferencing users, a plurality of talk frequency conditions respectively corresponding to the plurality of conferencing users may be determined based upon the monitored plurality of data streams. The plurality of talk frequency conditions may comprise, for example, active-talker, infrequent talker, or listener-only. Next, a plurality of data packet size values respectively corresponding to the plurality of conferencing users may be determined based upon the determined plurality of talk frequency conditions. The plurality of data streams may then be mixed to create data. Next, the data may be transmitted to each of the plurality of conferencing users respectively using the determined plurality of data packet size values respectively corresponding to the plurality of conferencing users.

17 Claims, 4 Drawing Sheets

U.S. PATENT DOCUMENTS

| | | | |
|---|---|---|---|
| 2006/0199594 A1 | 9/2006 | Gundu | 455/452.2 |
| 2007/0053303 A1 | 3/2007 | Kryuchkov | 370/250 |
| 2008/0080685 A1* | 4/2008 | Barnes et al. | 379/112.05 |
| 2008/0312923 A1* | 12/2008 | Crinon et al. | 704/246 |

OTHER PUBLICATIONS

Yang-hua Chu et al., "Enabling Conferencing Applications on the Internet using an Overlay Multicast Architecture," pp. 55-67, http://delivery.acm.org/10.1145/390000/383064/p55-chu.pdf?key1=383064&key2=9384263811&coll=GUIDE&CFID=23100918&CFTOKEN=80350548.

Sue B. Moon et al., "Packet Audio Playout Delay Adjustment: Performance Bounds and Algorithms," pp. 1-35, http://www.cs.wpi.edu/~claypool/courses/525-S02/papers/buffer/moon-jitter-98.ps

* cited by examiner

OPTIMIZING CONFERENCING PERFORMANCE

BACKGROUND

In telecommunication, teleconferencing is the live exchange and mass articulation of information among persons and machines remote from one another but linked by a telecommunications system, for example, a telephone system. Computers have given new meaning to the term because they allow groups to do much more than just talk. Once a teleconference is established, the group can share applications and mark up a common whiteboard.

Broadly speak, teleconferencing comprises various ways by which people communicate with one another over some distance. In a narrow sense, a teleconference is a two-way, interactive meeting, between relatively small groups of people (approximately 1 to 10 at each end), who may use permanent teleconferencing facilities. A teleconference involves audio communication between the locations, but may also involve video or graphics. One problem with conventional teleconferencing systems is that as more participants are added to the teleconference, the conventional teleconferencing systems' quality and performance degrades. In other words, as more participants are added to conventional teleconferencing systems, the conventional system's overall latency increases and long delays are created between when participants can speak.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Optimized conferencing performance may be provided. First, a plurality of data streams respectively received from a plurality of conferencing users may be monitored. Then, for each of the plurality of conferencing users, a plurality of talk frequency conditions respectively corresponding to the plurality of conferencing users may be determined based upon the monitored plurality of data streams. The plurality of talk frequency conditions may comprise, for example, active-talker, infrequent talker, or listener-only. Next, a plurality of data packet size values respectively corresponding to the plurality of conferencing users may be determined based upon the determined plurality of talk frequency conditions. The plurality of data streams may then be mixed to create data. Next, the data may be transmitted to each of the plurality of conferencing users respectively using the determined plurality of data packet size values respectively corresponding to the plurality of conferencing users.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
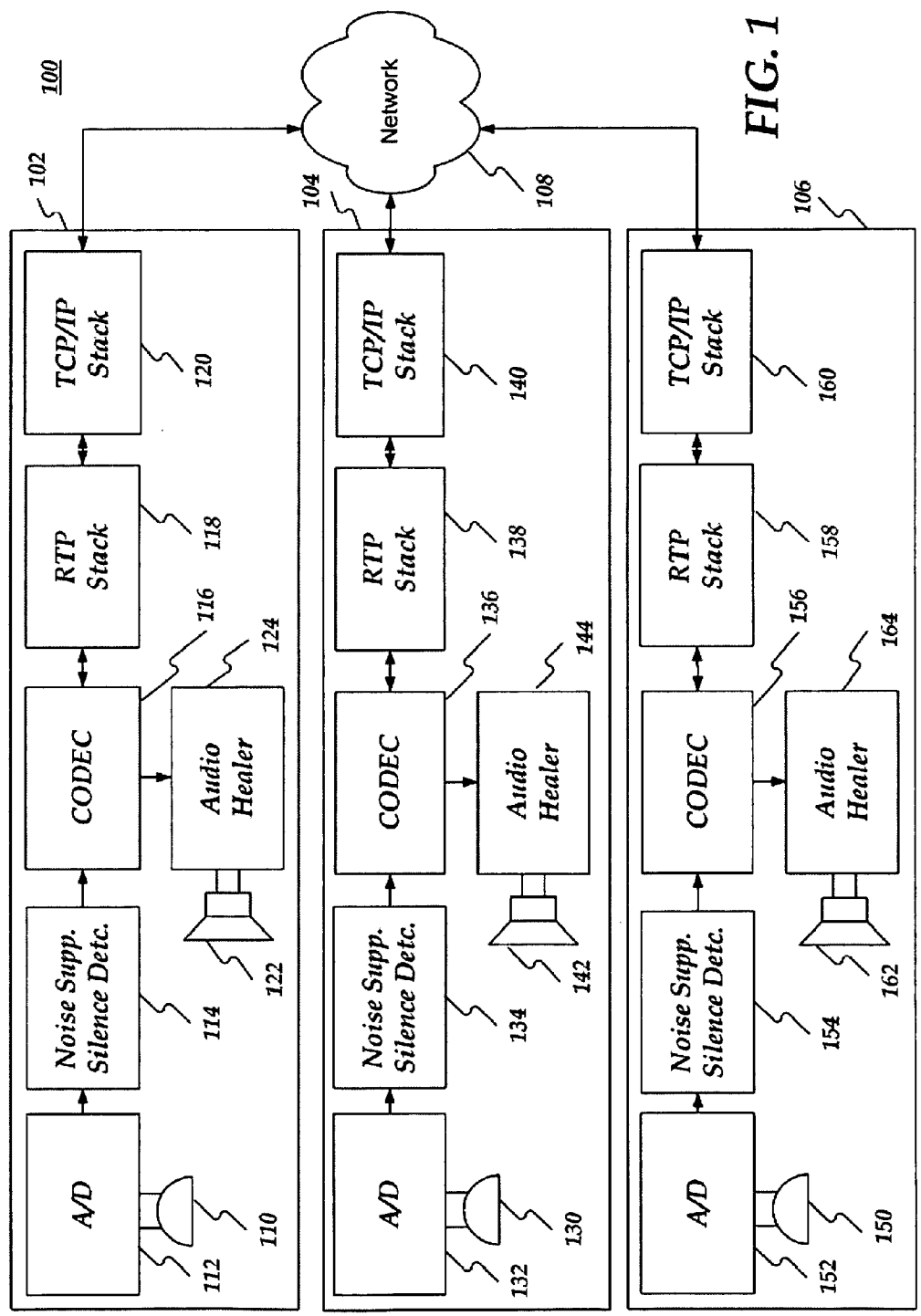
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, a scalable and high quality audio conferencing solution that runs on standard server hardware may be provided. To achieve this, embodiments of the invention may manipulate audio stream packetization time. For example, when speech (i.e. sound) is encoded into audio, it is split into packets that are generally smaller than a network's maximum transmission unit (MTU.) The network's MTU may comprise, but is not limited to, 150 ms. Coder/Decoders (CODECs) may support several modes that allows a developer to set the packetization to a size based on a time interval, for example, 20 ms, 40 ms, or 60 ms. If the packetization is sized to fill an MTU, a delay on the network may be caused, for example, that a user may notice during a two way conversation.

When data is packetized into small segments, two performance aspects may come into play. A first performance aspect may comprise a resource to package each segment (i.e. packet) and send it on the network. The first performance aspect may be called a central processing unit (CPU) cost. A second performance aspect may comprise a network overhead amount that may be created with small segments. For example, each segment when transmitted on the network, may be wrapped with a header (e.g. IP/UDP/RTP.) The header, for example, may comprise 60 bytes of data. If the packetization is broken into these smaller segments, each segment may need a header no matter how small the segment. This network overhead may add, for example, up to 50% additional data to be transmitted on the network. In other words, keeping the delay low means sending many small segments, but trying to keep the CPU costs low means sending a few number, but large segments. As CPU cost goes down, server efficiency may increase.

Consistent with embodiments of the invention various conditions may be monitored on a system. Then, for certain detected conditions, more delay may be tolerated by the system. One condition may be, in a teleconference, were a user is not allowed to speak, but only listen. Consistent with embodiments of the inventions, for a user who is "listener-only", the system may increase the delay for the listener-only user sending the listen only user a fewer number, but large packets.

Another condition may be that a user has not spoken in a while. In this case the system may actively look at each user and what each user is doing. The system may then estimate whether the user may be able to tell if there is a delay in the system. If the system user has not spoken in a while (e.g.

infrequent talker), the system may determine that the user may not be likely to speak in the future. Consequently, the system may increase the packet size and thus increase the delay for that user to cut CPU cost down. If the system determines that the user is a frequent speaker (e.g. "active-talker"), then the system may keep the packet size small for the frequent speaker while sacrificing CPU cost. In other words, if the system determines that a user can tolerate a larger delay without noticing, the system may increase the packet size for the user to save CPU cost and consequently increase server efficiency.

FIG. 1 is a block diagram of an operating environment 100. As shown in FIG. 1, operating environment 100 may include a first client server 102, a second client server 104, and a third client server 106 that may be connected to a network 108. Consistent with embodiments of the invention, operating environment 100 may include other client servers and is not limited to first client server 102, second client server 104, and third client server 106.

First client server 102 may include a first microphone 110, a first analog-to-digital (A/D) converter 112, a first noise suppressor/silence detector (NSSD) 114, a first coder/decoder (CODEC) 116, a first real-time transport protocol (RTP) stack 118, a first transmission control protocol/internet protocol (TCP/IP) stack 120, a first speaker 122, and a first audio healer 124. Second client server 104 and third client server 106 may be constructed similarly to first client server 102. For example, second client server 104 may include a second microphone 130, a second A/D converter 132, a second NSSD 134, a second CODEC 136, a second RTP stack 138, a second TCP/IP stack 140, a second speaker 142, and a second healer 144. Similarly, third client server 106 may include a third microphone 150, a third A/D converter 152, a third NSSD 154, a third CODEC 156, a third RTP stack 158, a third TCP/IP stack 160, a third speaker 162, and a third audio healer 164.

Figure 2:
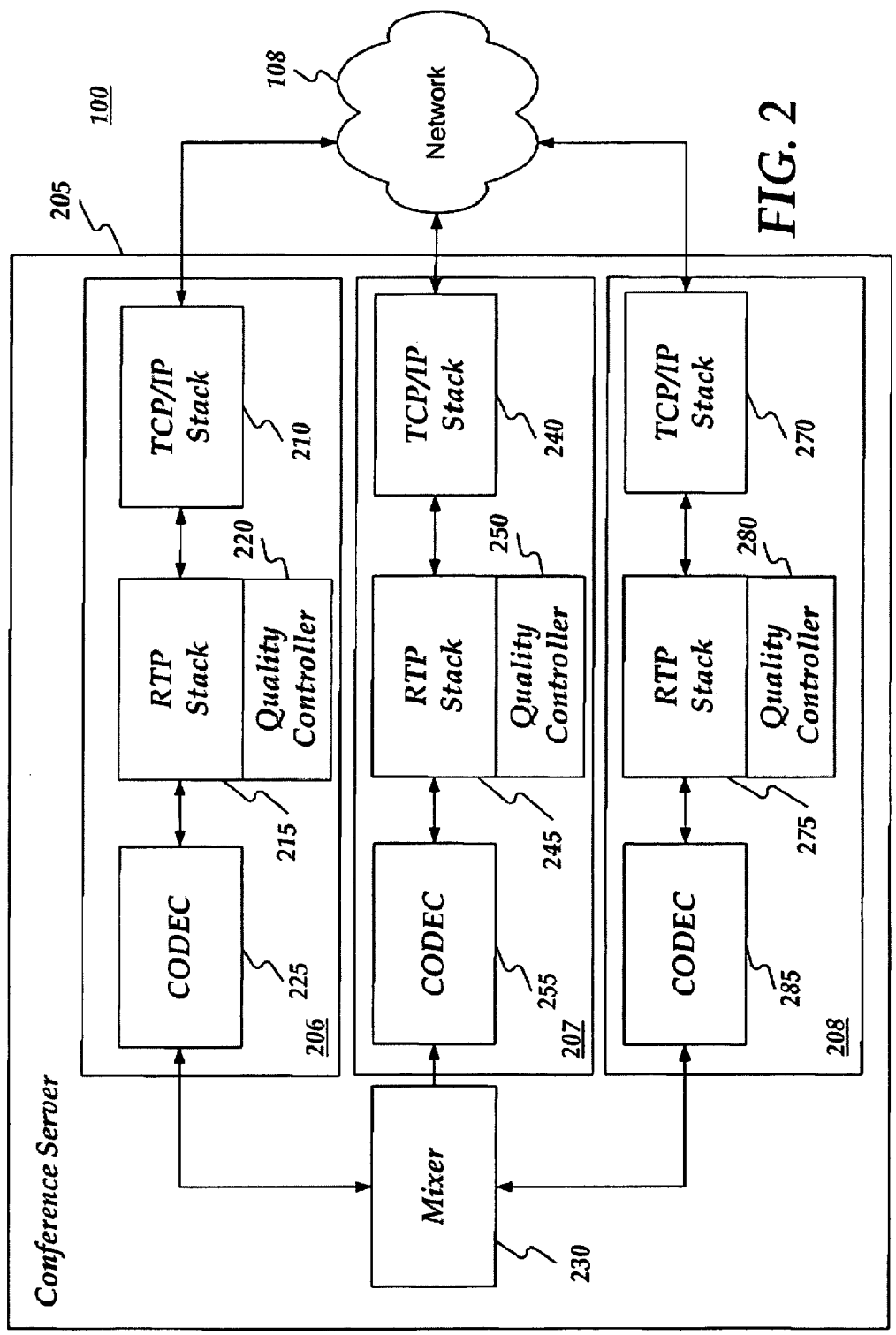
FIG. 2 is a block diagram of an operating environment.

FIG. 2 is a block diagram of more elements in operating environment 100 including a conference server 205. As shown in FIG. 2, conference server 205 may comprise a first sub-conference server 206, a second sub-conference server 207, a third sub-conference server 208, and a mixer 230. Each of first sub-conference server 206, second sub-conference server 207, and third sub-conference server 208 may respectively correspond to first client server 102, second client server 104, and third client server 106. Conference server 205 may communicate with first client server 102, second client server 104, and third client server 106 over network 108.

First sub-conference server 206 may comprise a first sub-conference server TCP/IP stack 210, a first sub-conference server RTP stack 215, a first sub-conference server quality controller (QC) 220, and a first sub-conference server CODEC 225. Second sub-conference server 207 and third sub-conference server 208 may be constructed similarly to first sub-conference server 206. For example, second sub-conference server 207 may comprise a second sub-conference server TCP/IP stack 240, a second sub-conference server RTP stack 245, a second sub-conference server QC 250, and a second sub-conference server CODEC 255. Similarly, third sub-conference server 208 may comprise a third sub-conference server TCP/IP stack 270, a third sub-conference server RTP stack 275, a third sub-conference server QC 280, and a third sub-conference server CODEC 285.

Network 108 may comprise, for example, a local area network (LAN) or a wide area network (WAN). When a LAN is used as network 108, a network interface located at any of the processors (e.g. first client server 102, second client server 104, third client server 106, and conference server 205) may be used to interconnect any of the processors. When network 108 is implemented in a WAN networking environment, such as the Internet, the processors may include an internal or external modem (not shown) or other device for establishing communications over the WAN. Further, in utilizing network 108, data sent over network 108 may be encrypted to insure data security by using known encryption/decryption techniques.

In addition to utilizing a wire line communications system as network 108, a wireless communications system, or a combination of wire line and wireless may be utilized as network 108. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal or mobile computer, for example. For example, the processors may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802), a Bluetooth interface, a WiFi interface, a WiMax interface, another RF communication interface, and/or an optical interface.

As shown, in FIG. 1, first client server 102, second client server 104, and third client server 106 may comprise devices respectively used by a first user, a second user, and a third user to conduct, for example, a teleconference. Each of first client server 102, second client server 104, and third client server 106 may function in a similar manner. For example, the first user may speak into first microphone 110. First A/D converter 112 may convert the first user's speech from first microphone 110 into a digital data signal. Then, first A/D converter 112 may send the digital data signal to first NSSD 114. First NSSD 114 may suppress silence in that it may send no data when the first user is not speaking or when no other sound in coming into first microphone 110. In addition, first NSSD 114 may suppress sounds that teleconference listeners may consider to be noise.

First NSSD 114 may then send its output to first CODEC 116 that may compress the digital data signal from first NSSD 114. First CODEC 116 may then sends its output to first RTP stack 118. First RTP stack 118 may prepare the digital data signal to be sent over network 108. For example, first RTP stack 118 may assemble data packets from CODEC 116 and wrap them with the aforementioned header. The prepared packets may then be placed on first TCP/IP stack 120. From first TCP/IP stack 120, the packets may be sent over network 108 to the destination that may be defined in the packets' respective headers.

As shown in FIG. 2, conference server 205 may receive data packets sent from first client server 102, second client server 104, and third client server 106 over network 108. As stated above, each of first sub-conference server 206, second sub-conference server 207, and third sub-conference server 208 may respectively correspond to first client server 102, second client server 104, and third client server 106. In other words, data packets sent from first client server 102 may have headers addressed to first sub-conference server 206, data packets sent from second client server 104 may have headers addressed to second sub-conference server 207, and data packets sent from third client server 106 may have headers addressed to third sub-conference server 208. For example, first sub-conference server TCP/IP stack 210 may receive packets sent over network 108 from first TCP/IP stack 120.

First sub-conference server TCP/IP stack 210 may send the received packets to first sub-conference server RTP stack 215 where there respective headers may be stripped. From first sub-conference server RTP stack 215, the data from the packets may be decoded by first sub-conference server CODEC 225 and fed into mixer 230. Each of second sub-conference server 207 and third sub-conference server 208 may function in a similar way to first sub-conference server 206 processing data from there corresponding client servers (e.g. second client server 104 and third client server 106) and feeding this data to mixer 230.

As described above, mixer 230 may receive data streams that may respectively correspond to the first user's voice, the second user's voice, and the third user's voice. For example, because individual users may not want to hear their own voices, mixer 230 may create mixes (i.e. outgoing data streams) for each user that exclude the receiving user's voice. In other words, mixer 230 may mix the data streams from second sub-conference server 207 and third sub-conference server 208 designating this mix for the first user. Likewise, mixer 230 may mix the data streams from first sub-conference server 206 and third sub-conference server 208 designating this mix for the second user. Similarly, mixer 230 may mix the data streams from second sub-conference server 207 and first sub-conference server 206 designating this mix for the third user. Moreover, if any one or more users are designated as "listen only" and any one or more users are designated as "speakers," mixer 230 may prepare one mix of all the "speakers" and designate this one mix to be sent to all those designated as "listen only."

As will be described in more detain below with respect to FIG. 3, mixer 230 may send the mix designated for the first user to first sub-conference server 206, the mix designated for the second user to second sub-conference server 207, and the mix designated for the third user to third sub-conference server 208. Each of first sub-conference server 206, second sub-conference server 207, and third sub-conference server 208 may respectively prepare these mixes and send them over network 108 back to there respective corresponding first client server 102, second client server 104, and third client server 106. The respective mixes may then be decoded and played to there respective users. For example, first client server 102 may receive the mix designated for the first user and play it to the first user on first speaker 122.

Figure 3:
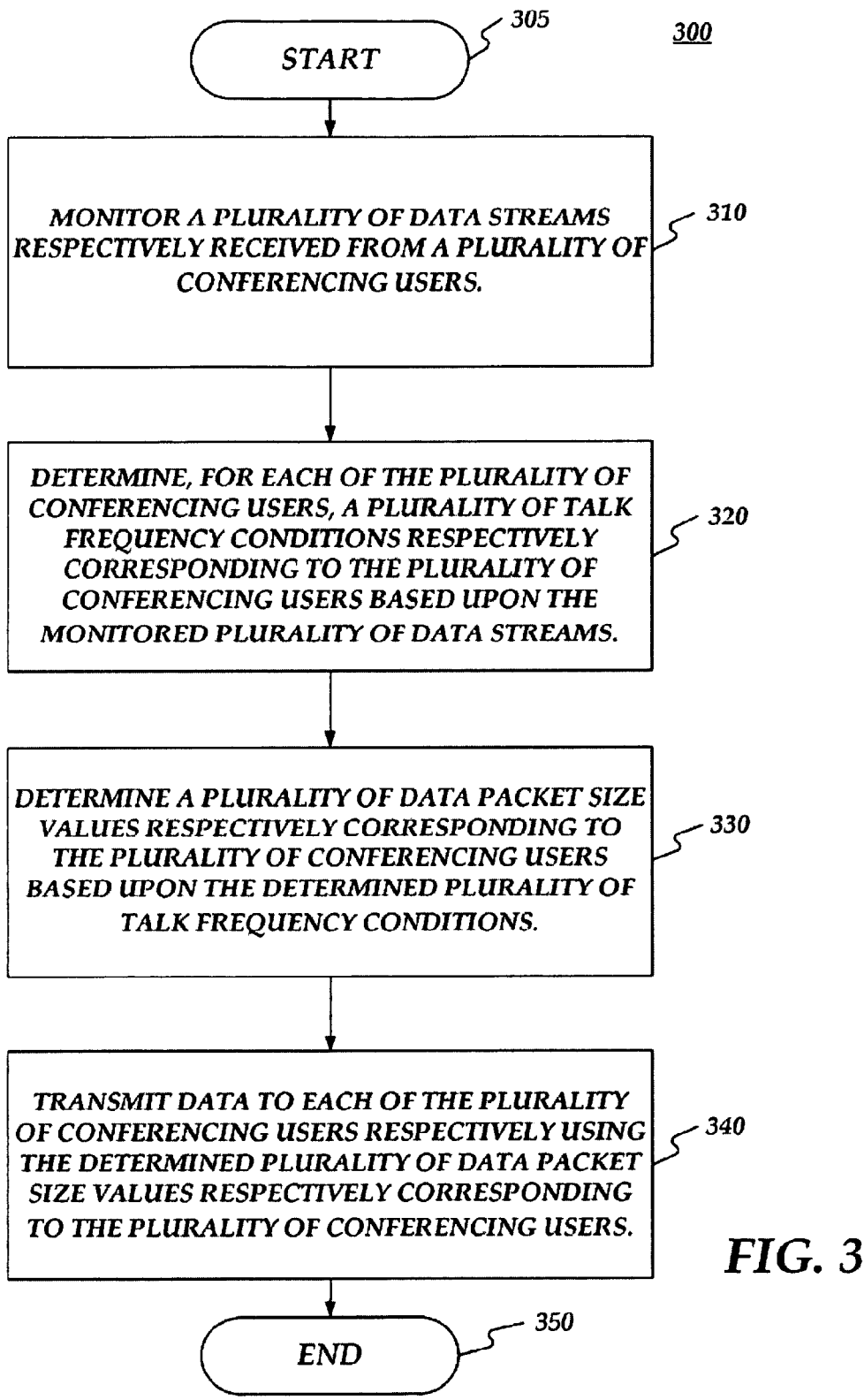
FIG. 3 is a flow chart of a method for optimizing conferencing performance.

FIG. 3 is a flow chart setting forth the general stages involved in a method 300 consistent with an embodiment of the invention for optimizing conferencing performance. Method 300 may be implemented using a conference server 205 as described in more detail below with respect to FIG. 4. Ways to implement the stages of method 300 will be described in greater detail below. Method 300 may begin at starting block 305 and proceed to stage 310 where conference server 205 may monitor a plurality of data streams respectively received from a plurality of conferencing users. For example, conference server 205 may receive data packets sent from first client server 102, second client server 104, and third client server 106 over network 108. In other words, each of first sub-conference server 206, second sub-conference server 207, and third sub-conference server 208 may respectively receive data streams from first client server 102, second client server 104, and third client server 106. Each of the respective data streams may respectively correspond a first user's voice, a second user's voice, and a third user's voice where each of the first user, second user, and third user are engaged in a conference call respectively using first client server 102, second client server 104, and third client server 106. The conference may comprise, but is not limited to, a voice-over-internet protocol (VOIP) conference over network 108.

From stage 310, where conference server 205 monitors the plurality of data streams, method 300 may advance to stage 320 where conference server 205 may determine, for each of the plurality of conferencing users, a plurality of talk frequency conditions respectively corresponding to the plurality of conferencing users based upon the monitored plurality of data streams. For example, the plurality of talk frequency conditions may comprise, but are not limited to, active-talker, infrequent talker, and listener-only. Regarding the aforementioned example conference, the first user may be an "active-talker", the second user may be an "infrequent-talker", and the third user may be a "listener-only." Embodiments of the invention are not limited to three callers on a conference and may comprise any number of users in any combination of active-talker, infrequent-talker, and listener-only talk frequency conditions.

An active-talker may be a user who talks very frequently during a conference. An infrequent-talker may be a user who talks less frequent that an active talker during the conference. And a listener-only may be a user who never talks during a conference. The talk frequency conditions may be preset before a conference with each user being predetermined to correspond to a certain talk frequency condition. Consistent with embodiments of the invention, conference server 205 may monitor data streams received from the users and assign certain talk frequency conditions to the users. Furthermore, conference server 205 may dynamically reassign talk frequency conditions to the users during a conference based on the monitored data streams. For example, conference server 205 may assign an infrequent-talker condition to a user if that user talks a factor less that the most frequent talker in the conference. Infrequent-talker condition may be assigned, for example, to a user who talks one-tenth as much as the most frequent talker in the conference. Or if conference server 205 determines, for example, that a gap of a predetermined length occurred within a predetermined time period, the user corresponding to that gap may be considered an infrequent-talker. In addition, if conference server 205 determines that a user has not spoken at all during a time period, that user may be considered listener-only.

Once conference server 205 determines the plurality of talk frequency conditions in stage 320, method 300 may continue to stage 330 where conference server 205 may determine a plurality of data packet size values respectively corresponding to the plurality of conferencing users based upon the determined plurality of talk frequency conditions. For example, to decrease delay and to keep a high level of quality, quality controllers may optimizes the conference for the active-talkers. For example, the most important person in the conference may be the user or users who are talking. Consequently, the active-talkers may be given the lowest delay stream in the conference. This is because the active-talkers are the ones most likely to notice any delay in the conference. Likewise, the listener-only users may be the least likely to notice any delay. In other words, in a large conference, users who are listener-only, being a one way passive conversation, can have a very high p-time (i.e. the amount of talk time per packet), for example, 100 ms or more even up to the system's MTU. However, when a user is detected as a active-talker by conference server 205, the quality controller (e.g. quality controller 220, 250, or 280) may dynamically adjust the p-time for the active-talker to have a lower delay, for example, 20 ms. Thus ensuring conversations may be appropriately interactive. Infrequent-talkers may be given a data packet size between the active-talkers and listener-only users.

After conference server 205 determines the plurality of data packet size values in stage 330, method 300 may proceed to stage 340 where conference server 205 may transmit data to each of the plurality of conferencing users respectively using the determined plurality of data packet size values respectively corresponding to the plurality of conferencing users. As described above, once mixer 230 creates an outgoing data stream to be sent to the user corresponding to first client server 102, this outgoing data stream may be sent to first sub-conference server 206. CODEC 225 may compress this outgoing data steam into compressed data packets of a certain size, for example, 20 ms. These compressed data packets may be sent to RTP stack 215 to be packaged with headers bound for first client server 102.

Consistent with embodiments of the invention, quality controller 220 may be configured to cause RTP stack 215 to collect one or more compressed data packets from CODEC 225 to be packaged dependent on the talk frequency condition associated with the first user associated with first client server 102. If the first user associated with first client server 102 is designated as an active-talker, quality controller 220 may cause RTP stack 215 to collect only one compressed data packet (e.g. of 20 ms each) from CODEC 225 to be packaged with a header bound for first client server 102. If the first user associated with first client server 102 is designated as listener-only, quality controller 220 may cause RTP stack 215 to collect a number of compressed data packets (e.g. of 20 ms each) from CODEC 225 to be packaged with a header bound for first client server 102. For example, quality controller 220 may cause RTP stack 215 to collect five compressed data packets (e.g. of 20 ms each) from CODEC 225 to be packaged with a header bound for first client server 102. In this example, the packaged data bound for first client server 102 may contain 100 ms of voice (e.g. 5 time 20 ms.) If the first user associated with first client server 102 is designated as an infrequent-talker, quality controller 220 may cause RTP stack 215 to collect a number of compressed data packets (e.g. of 20 ms each) from CODEC 225 to be packaged with a header bound for first client server 102. In the infrequent-talker example, the number of compressed data packets collected may comprise a number between what would be collected if the user were active-talker and if the user were listener-only. In the preceding example, this number may be between one and five. Once conference server 205 transmits the data to each of the plurality of conferencing users in stage 340, method 300 may then end at stage 350.

Consistent with other embodiments of the invention, quality controllers (e.g. quality controller 220, 250, or 280) may monitor several parameters that may be used to create a "health index" for conference server 205. One of the aforementioned parameters, for example, may be the number of transactions conference server 205 may be handling per second. The health index may then correspond to a performance profile that may have preset p-times for each stage on the index. In this example, when an algorithm determines that conference server 205 is at "Level 2", for example, the quality controllers (e.g. quality controller 220, 250, or 280) may respectively instruct the RTP stacks (e.g. RTP stack 215, 245, or 275) to change p-times for the encoders to 40 ms instead of 20 ms effectively decreasing by half the number of segments conference server 205 needs to process.

An embodiment consistent with the invention may comprise a system for optimizing conferencing performance. The system may comprise a memory storage and a processing unit coupled to the memory storage. The processing unit may be operative to monitor a plurality of data streams respectively received from a plurality of conferencing users. In addition, the processing unit may be operative to determine, for each of the plurality of conferencing users, a plurality of talk frequency conditions respectively corresponding to the plurality of conferencing users based upon the monitored plurality of data streams. Moreover, processing unit may be operative to determine a plurality of data packet size values respectively corresponding to the plurality of conferencing users based upon the determined plurality of talk frequency conditions. And the processing unit may be operative to transmit data to each of the plurality of conferencing users respectively using the determined plurality of data packet size values respectively corresponding to the plurality of conferencing users.

Another embodiment consistent with the invention may comprise a system for optimizing conferencing performance. The system may comprise a memory storage and a processing unit coupled to the memory storage. The processing unit may be operative to determine, for each of a plurality of conferencing users, a plurality of talk frequency conditions respectively corresponding to the plurality of conferencing users based upon a monitored plurality of data streams. In addition, the processing unit may be operative to determine a plurality of data packet size values respectively corresponding to the plurality of conferencing users based upon the determined plurality of talk frequency conditions. Furthermore, the processing unit may be operative to mix the plurality of data streams to create data and to transmit the data to each of the plurality of conferencing users respectively using the determined plurality of data packet size values respectively corresponding to the plurality of conferencing users.

Yet another embodiment consistent with the invention may comprise a system for optimizing conferencing performance. The system may comprise a memory storage and a processing unit coupled to the memory storage. The processing unit may be operative to monitor a plurality of data streams respectively received from a plurality of conferencing users. In addition, the processing unit may be operative to determine, for each of the plurality of conferencing users, a plurality of talk frequency conditions respectively corresponding to the plurality of conferencing users based upon the monitored plurality of data streams. Moreover, the processing unit may be operative to determine a plurality of data packet size values respectively corresponding to the plurality of conferencing users based upon the determined plurality of talk frequency conditions. The processing unit being operative to determine the plurality of data packet size values respectively may comprise the processing unit being operative to i) determine a first packet size value for a first one of the plurality of conferencing users when it is determined that the first one of the plurality of conferencing users is an active-talker; ii) determine a second packet size value for a second one of the plurality of conferencing users when it is determined that the second one of the plurality of conferencing users is an infrequent-talker; and iii) determine a third packet size value for a third one of the plurality of conferencing users when it is determined that the third one of the plurality of conferencing users is a listener-only. The third packet size may be greater than the second packet size and the second packet size may be greater that the first packet size value. The first packet size value may be configured to hold no more than 20 ns of voice from the first one of the plurality of conferencing users and the third packet size value may be configured to hold at least 100 ns of voice from the third one of the plurality of conferencing users. Furthermore, processing unit may be operative to mix the plurality of data streams to create data and to transmit the data to each of the plurality of conferencing users respectively using the determined plurality of data packet size values respectively corresponding to the plurality of conferencing users.

Figure 4:
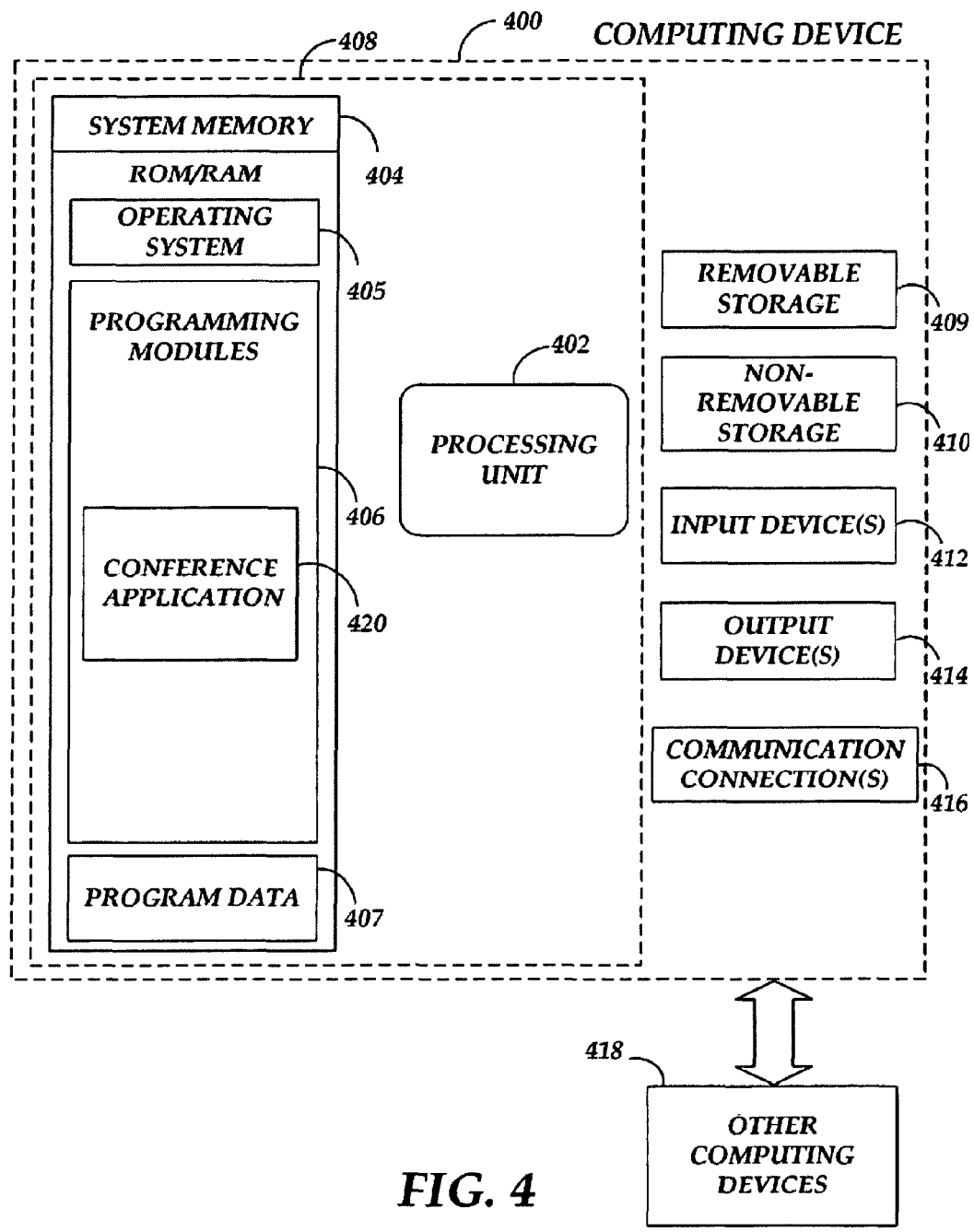
FIG. 4 is a block diagram of a system including a conferencing server.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. Other computing devices 418 may comprise, for example, but are not limited to first client server 102, second client server 104, and third client server 106. The aforementioned system, device, and processors are examples and other systems, devices, and processors may comprise the aforementioned memory storage and processing unit, consistent with embodiments of the invention. Furthermore, computing device 400 may comprise an operating environment for conference server 205 as described above. Conference server 205 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include, for example, a conference application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. conference application 420) may perform processes including, for example, one or more method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for optimizing conferencing performance, the method comprising:
    monitoring a plurality of data streams respectively received from a plurality of conferencing users;
    determining, for each of the plurality of conferencing users, a plurality of talk frequency conditions respectively corresponding to the plurality of conferencing users based upon the monitored plurality of data streams;
    determining a plurality of data packet size values respectively corresponding to the plurality of conferencing users based upon the determined plurality of talk frequency conditions; and
    transmitting data to each of the plurality of conferencing users respectively using the determined plurality of data packet size values respectively corresponding to the plurality of conference users;
    wherein determining the plurality of data packet size values respectively corresponding to the plurality of conferencing users based upon the determined plurality of talk frequency conditions comprises: determining a first packet size value for a first one of the plurality of conferencing users when it is determined that the first one of the plurality of conferencing users is an active-talker; determining a second packet size value for a second one of the plurality of conferencing users when it is determined that the second one of the plurality of conferencing users is an infrequent-talker; and
    determining a third packet size value for a third one of the plurality of conferencing users when it is determined that the third one of the plurality of conferencing users is a listener-only, wherein the third packet size is greater than the second packet size and the second packet size is greater than the first packet size value, wherein the first packet size value is configured to hold no more than 20 ns of voice from the first one of the plurality of conferencing users and the third packet size value is configured to hold at least 100 ns of voice from the third one of the plurality of conferencing users.

2. The method of claim 1, wherein monitoring the plurality of data streams respectively received from the plurality of conferencing users comprises monitoring the plurality of data streams respectively received from the plurality of conferencing users using a respective plurality of client servers.

3. The method of claim 1, wherein monitoring the plurality of data streams respectively received from the plurality of conferencing users comprises monitoring the plurality of data streams respectively received from the plurality of conferencing users engaged in a teleconference.

4. The method of claim 1, wherein monitoring the plurality of data streams respectively received from the plurality of conferencing users comprises monitoring the plurality of data streams comprising voice-over-internet protocol (VOIP) data streams.

5. The method of claim 1, wherein determining the plurality of talk frequency conditions comprises determining the plurality of talk frequency conditions comprising at least two of the following: active-talker, infrequent talker, and listener-only.

6. The method of claim 1, wherein determining the plurality of talk frequency conditions comprises:
    determining a first one of the plurality of conferencing users is an active-talker;

determining a second one of the plurality of conferencing users is an infrequent-talker; and determining a third one of the plurality of conferencing users is a listener-only.

7. The method of claim 1, wherein determining the plurality of talk frequency conditions comprises determining a first one of the plurality of conferencing users is an active-talker and determining a second one of the plurality of conferencing users is an infrequent-talker when a first of the plurality of data streams corresponding to the first one of the plurality of conferencing users and a second of the plurality of data streams corresponding to the second one of the plurality of conferencing users indicates that the first one of the plurality of conferencing users talks at least ten times as much as the second one of the plurality of conferencing users within a time period.

8. The method of claim 1, wherein determining the plurality of talk frequency conditions comprises determining a second one of the plurality of conferencing users is an infrequent-talker when a second of the plurality of data streams corresponding to the second one of the plurality of conferencing users indicates that a gap of a predetermined length occurred in the second of the plurality of data streams.

9. The method of claim 1, wherein determining the plurality of talk frequency conditions comprises determining a third one of the plurality of conferencing users is a listener-only user when a third of the plurality of data streams corresponding to the third one of the plurality of conferencing users indicates that the third one of the plurality of conferencing users does not talk within a time period.

10. The method of claim 1, wherein determining the plurality of data packet size values respectively corresponding to the plurality of conferencing users based upon the determined plurality of talk frequency conditions comprises determining a third packet size value for a third one of the plurality of conferencing users when it is determined that the third one of the plurality of conferencing users is a listener-only, wherein the third packet size is equal to a maximum transmission unit (MTU) for a network over which the plurality of conferencing users are engaged in a teleconference.

11. The method of claim 1, further comprising, prior to transmitting the data to each of the plurality of conferencing users, mixing the plurality of data streams to create the data.

12. A non-transitory computer-readable medium which stores a set of instructions which when executed performs a method for optimizing conferencing performance, the method executed by the set of instructions comprising:

determining, for each of a plurality of conferencing users, a plurality of talk frequency conditions respectively corresponding to the plurality of conferencing users based upon a monitored plurality of data streams;

determining a plurality of data packet size values respectively corresponding to the plurality of conferencing users based upon the determined plurality of talk frequency conditions;

mixing the plurality of data streams to create data; and transmitting the data to each of the plurality of conferencing users respectively using the determined plurality of data packet size values respectively corresponding to the plurality of conference users;

wherein determining the plurality of data packet size values respectively corresponding to the plurality of conferencing users based upon the determined plurality of talk frequency conditions comprises: determining a first packet size value for a first one of the plurality of conferencing users when it is determined that the first one of the plurality of conferencing users is an active-talker;

determining a second packet size value for a second one of the plurality of conferencing users when it is determined that the second one of the plurality of conferencing users is an infrequent-talker; and determining a third packet size value for a third one of the plurality of conferencing users when it is determined that the third one of the plurality of conferencing users is a listener-only, wherein the third packet size is greater than the second packet size and the second packet size is greater than the first packet size value, wherein the first packet size value is configured to hold no more than 20 ns of voice from the first one of the plurality of conferencing users and the third packet size value is configured to hold at least 100 ns of voice from the third one of the plurality of conferencing users.

13. The computer-readable medium of claim 12, wherein determining the plurality of talk frequency conditions comprises determining the plurality of talk frequency conditions comprising at least two of the following: active-talker, infrequent talker, and listener-only.

14. The computer-readable medium of claim 12, wherein determining the plurality of talk frequency conditions comprises:

determining a first one of the plurality of conferencing users is an active-talker;

determining a second one of the plurality of conferencing users is an infrequent-talker; and determining a third one of the plurality of conferencing users is a listener-only.

15. The computer-readable medium of claim 12, wherein determining the plurality of talk frequency conditions comprises determining a second one of the plurality of conferencing users is an infrequent-talker when a second of the plurality of data streams corresponding to the second one of the plurality of conferencing users indicates that a gap of a predetermined length occurred in the second of the plurality of data streams.

16. The computer-readable medium of claim 12, wherein determining the plurality of talk frequency conditions comprises determining a third one of the plurality of conferencing users is a listener-only user when a third of the plurality of data streams corresponding to the third one of the plurality of conferencing users indicates that the third one of the plurality of conferencing users does not talk within a time period.

17. A system for optimizing conferencing performance, the system comprising:

a memory storage; and a processing unit coupled to the memory storage, wherein the processing unit is operative to:

monitor a plurality of data streams respectively received from a plurality of conferencing users;

determine, for each of the plurality of conferencing users, a plurality of talk frequency conditions respectively corresponding to the plurality of conferencing users based upon the monitored plurality of data streams;

determine a plurality of data packet size values respectively corresponding to the plurality of conferencing users based upon the determined plurality of talk frequency conditions wherein the processing unit being operative to determine the plurality of data packet size values respectively corresponding to the plurality of conferencing users based upon the determined plurality of talk frequency conditions comprises the processing unit being operative to:

determine a first packet size value for a first one of the plurality of conferencing users when it is determined that the first one of the plurality of conferencing users is an active-talker, determine a second packet size value for a second one of the plurality of conferencing users when it is determined that the second one of the plurality of conferencing users is an infrequent-talker, and determine a third packet size value for a third one of the plurality of conferencing users when it is determined that the third one of the plurality of conferencing users is a listener-only, wherein the third packet size is greater than the second packet size and the second packet size is greater than the first packet size value, wherein the first packet size value is configured to hold no more than 20 ns of voice from the first one of the plurality of conferencing users and the third packet size value is configured to hold at least 100 ns of voice from the third one of the plurality of conferencing users;

mix the plurality of data streams to create data; and transmit the data to each of the plurality of conferencing users respectively using the determined plurality of data packet size values respectively corresponding to the plurality of conferencing users.

* * * * *